(12) United States Patent
Wilsher et al.

(10) Patent No.: US 9,942,435 B1
(45) Date of Patent: Apr. 10, 2018

(54) CARRIAGE MODULE DESIGN TO MINIMIZE CVT TO PLATEN TRANSITION DISTURBANCE

(71) Applicant: Xerox Corporation, Norwalk, CT (US)

(72) Inventors: Michael John Wilsher, Herts (GB); Sebastián Rodrigo de Echaniz, Milton Keynes (GB); Benjamin Thomas Thurnell, Hertfordshire (GB); Paul Simon Golding, Hertford (GB)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/430,575

(22) Filed: Feb. 13, 2017

(51) Int. Cl.
*H04N 1/04* (2006.01)
*H04N 1/047* (2006.01)
*H04N 1/00* (2006.01)
*H04N 1/10* (2006.01)
*H04N 1/031* (2006.01)
*H04N 1/193* (2006.01)

(52) U.S. Cl.
CPC ......... *H04N 1/047* (2013.01); *H04N 1/00549* (2013.01); *H04N 1/031* (2013.01); *H04N 1/1061* (2013.01); *H04N 1/193* (2013.01); *H04N 2201/0081* (2013.01); *H04N 2201/02491* (2013.01); *H04N 2201/02497* (2013.01)

(58) Field of Classification Search
CPC .... G03G 21/0029; G03G 15/60; G03G 15/04; G03G 15/161; G03G 15/602; G03G 21/105; G03G 21/12; G03G 2215/00316; G03G 2215/0448; G03G 15/23; G03G 2215/00189; G03G 2215/00194; H04N 2201/04755; H04N 1/193; H04N 2201/02439

USPC ....... 358/474, 488, 498, 406, 464, 401, 449, 358/463, 475, 504, 486, 487, 496, 497, 358/296, 3.06, 3.26, 444, 450, 453, 471, 358/472, 505, 514, 1.12, 1.9, 3.02, 3.15, 358/405, 437

See application file for complete search history.

(56) References Cited

U.S. PATENT DOCUMENTS

| 9,774,755 B1* | 9/2017 | de Echaniz | H04N 1/1061 |
| 9,781,283 B1* | 10/2017 | Wilsher | H04N 1/00628 |
| 2004/0047654 A1* | 3/2004 | Hayashi | G03G 15/04 399/208 |
| 2005/0174525 A1* | 8/2005 | Tsuboi | G02F 1/1333 349/158 |
| 2005/0270612 A1* | 12/2005 | Akiyama | G02B 26/121 359/206.1 |

(Continued)

*Primary Examiner* — Negussie Worku
(74) *Attorney, Agent, or Firm* — Fay Sharpe LLP

(57) ABSTRACT

In order to mitigate image defects caused by unwanted disturbances as a carriage module travels from a continuous velocity transport module across a CVT ramp to a platen module, a bottom surface of the CVT ramp is recessed relative to bottom surfaces of the CVT glass and platen glass to facilitate a smooth transition as the CIS carriage passes the CVT ramp during scanning. An additional carriage button is also provided on the carriage surface to ensure that at least two carriage buttons are biased against the CVT-platen assembly at all times, thereby mitigating vibrational disturbance in the system during scanning motion. The carriage module may be a contact image sensor (CIS) carriage module, a Full Width Array (FWA) carriage module, or a folded Charged Coupled Device (CCD) carriage module.

24 Claims, 6 Drawing Sheets

(56) References Cited

U.S. PATENT DOCUMENTS

| | | | |
|---|---|---|---|
| 2007/0081202 A1* | 4/2007 | Miyamoto | H04N 1/00933 358/496 |
| 2009/0059338 A1* | 3/2009 | Endo | G02B 27/0031 359/207.6 |
| 2010/0247189 A1* | 9/2010 | Akamatsu | G03G 21/0029 399/350 |
| 2011/0134491 A1* | 6/2011 | Golding | H04N 1/401 358/453 |
| 2011/0199655 A1* | 8/2011 | Takahashi | H04N 1/121 358/498 |
| 2012/0107013 A1* | 5/2012 | Kaneyama | G03G 15/161 399/101 |
| 2013/0234994 A1* | 9/2013 | Hecht | G06F 3/043 345/177 |
| 2015/0138611 A1* | 5/2015 | Golding | H04N 1/00087 358/475 |
| 2016/0330344 A1* | 11/2016 | Wilsher | H04N 1/1065 |
| 2017/0149303 A1* | 5/2017 | Urch | H02K 7/025 |
| 2017/0180587 A1* | 6/2017 | Wilsher | H04N 1/047 |

* cited by examiner

CARRIAGE MODULE DESIGN TO MINIMIZE CVT TO PLATEN TRANSITION DISTURBANCE

TECHNICAL FIELD

The presently disclosed embodiments are directed toward image scanning systems. However, it is to be appreciated that the present exemplary embodiments are also amenable to other like applications.

BACKGROUND

Conventional scanner designs use a contact image sensor datumed to the underside of the platen/continuous velocity transport (CVT) glass via only two buttons or bumps. As the image sensor moves across the transition between the CVT and the platen, a disturbance in the imaging is observed. This problem is also observed in scanning systems using Full Width Array (FWA) or folded Charged Coupled Device (CCD) optics designs.

FIG. 1 illustrates a conventional scanner system 10 that uses only two buttons at the end of the optics carriage and therefore experiences turbulent motion during the transition between the CVT and platen, which results in unwanted motion disturbances, which in turn affect image quality. The system shows a continuous velocity transport (CVT) glass portion 12, a continuous velocity transport ramp 14 comprising a calibration strip 16, and a platen glass portion 18. The system further comprises a contact image sensor (CIS) module 20 that includes two buttons, 22 and 24, which support the continuous velocity transport, continuous velocity transport ramp, and platen as the scanner moves during scanning.

A conventional continuous velocity transport ramp picks paper up off the continuous velocity transport glass and guides it into a document handler. To prevent stub points, the conventional continuous velocity transport ramp is arranged to extend below the continuous velocity transport glass, as such the CVT glass must be separate from the platen glass. It is not possible to get a perfectly flat area from the CVT glass to the underside of the ramp and to the platen glass due to glass and molding tolerances. Therefore, there is a difference in height as the CIS module transitions from the continuous velocity transport glass portion across the ramp area to the platen glass. In the conventional configuration, the continuous velocity transport ramp molding (the bottom of the continuous velocity transport ramp between the continuous velocity transport glass and platen glass portions) sits slightly below the continuous velocity transport glass and platen glass heights, and as the buttons 22, 24 pass under this area, the imaging point and height is disturbed. This gives rise to a disturbance in the sensed brightness of the calibration strip as illustrated in FIGS. 2-3.

FIG. 2 shows an image 40 of a calibration strip reading where motion disturbance has occurred, such as is caused by jitter cause by the transition of the unevenly arranged continuous velocity transport ramp over a button. That is, the bottom surface of the continuous velocity transport ramp, being lower than the bottom surfaces of the continuous velocity transport glass and the platen glass, introduces a disturbance during the transition of the CIS module buttons as they pass across the continuous velocity transport ramp bottom surface. This, in turn, causes the distance from the imaged surface to the calibration strip to be inconsistent, which results in the gray value measured from the calibration strip to be inconsistent as well, as illustrated by the lines 42. A similar disturbance can occur in the platen area.

FIG. 3 illustrates a graph 50 plotting positional disturbance (in microns) on the y-axis against slow scan distance (in pixels) on the x-axis. As can be seen, there two peaks 52 that correspond to the lies 42 of FIG. 2. The two peaks 52 represent disturbances cause by the transition of the lower edge of the continuous velocity transport ramp as it passes over a button. The measured gray values are affected by the inconsistency in the distance of the scanned page from the calibration strip during the transition of the continuous velocity transport ramp lower surface over the buttons(s).

FIG. 4 shows a graph 60 of a motion quality effect 62 that occurs at the beginning of the platen scan when the conventional image module is still vibrating from the ramp disturbance. Positional disturbance (in microns) is shown on the y-axis and slow scan distance (in pixels) is shown on the x-axis.

There is a need in the art for a carriage module and CVT-platen arrangement that facilitates mitigating motion disturbances during CVT-to-platen transition during scanner motion, while overcoming the aforementioned deficiencies.

BRIEF DESCRIPTION

In one aspect, a scanner system that facilitates mitigating motion disturbances to improve image quality comprises a CVT-platen assembly having a CVT glass portion, a platen glass portion, and a CVT ramp portion positioned between the CVT glass portion and the platen glass portion, wherein a bottom surface of the CVT ramp portion is recessed relative to a bottom surface of the CVT glass portion and a bottom surface of the platen glass portion. The system further comprises a carriage module comprising a plurality of carriage buttons that bias the CVT-platen assembly upward.

In another aspect, a scanner system that facilitates mitigating vibration during scanning to improve image quality comprises a CVT-platen assembly comprises a CVT glass portion, a platen glass portion, and a CVT ramp portion positioned between the CVT glass portion and the platen glass portion, wherein a bottom surface of the CVT ramp portion is recessed relative to a bottom surface of the CVT glass portion and a bottom surface of the platen glass portion. The system further comprises a carriage module comprising a plurality of carriage skids that bias the CVT-platen assembly upward.

In another aspect, a scanner system that facilitates mitigating vibration during scanning to improve image quality comprises a CVT-platen assembly comprises a CVT glass portion, a platen glass portion, and a CVT ramp portion positioned between the CVT glass portion and the platen glass portion, wherein a bottom surface of the CVT ramp portion is recessed relative to a bottom surface of the CVT glass portion and a bottom surface of the platen glass portion. The system further comprises a carriage module comprising single skid that biases the CVT-platen assembly upward during scanning, wherein the skid is positioned such that it runs parallel to a direction of travel of the CIS carriage module.

BRIEF DESCRIPTION OF THE DRAWINGS

The embodiments disclosed herein will be better understood from the following detailed description with reference to the drawings, which are not necessarily drawn to scale and in which.

DETAILED DESCRIPTION

The embodiments of the invention and the various features and advantageous details thereof are explained more fully with reference to the non-limiting embodiments that are illustrated in the accompanying drawings and detailed in the following description.

The aforementioned problems are solved by providing an additional button to the carriage and recessing the continuous velocity transport ramp underside so that there are always at least two carriage buttons in contact with the glass, which minimizes disturbances and vibration.

Figure 1:
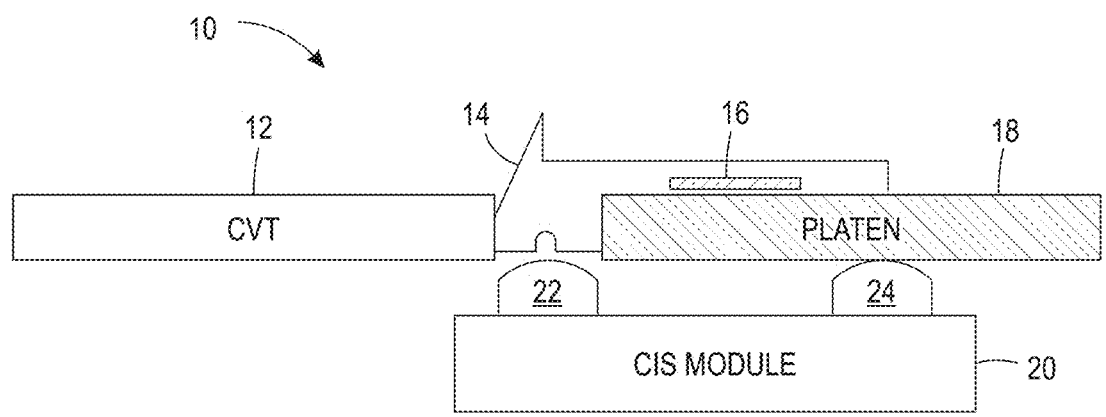
FIG. 1 illustrates a scanner system that uses only two buttons and therefore experiences disturbed motion during scanning, which results in unwanted motion disturbances, which in turn affect image quality.
Figure 2:
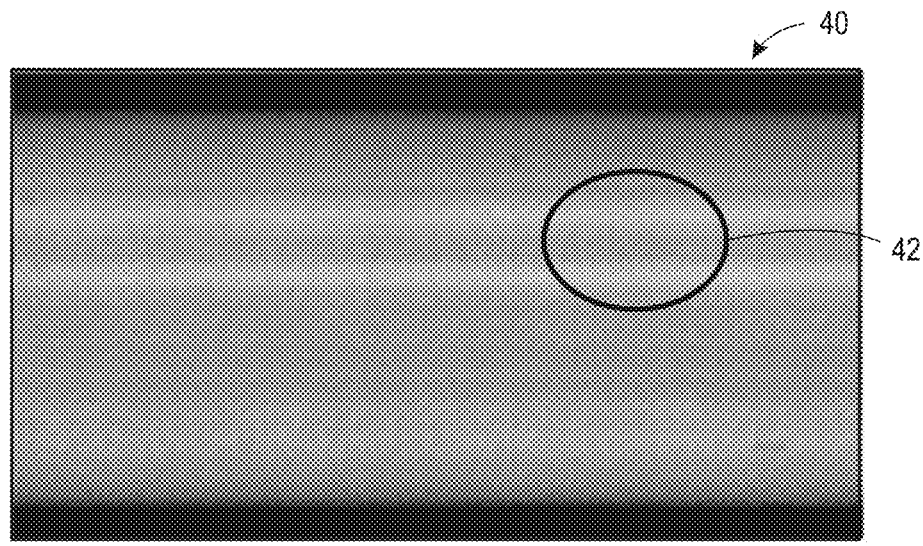
FIG. 2 shows an image of an abnormal top center view of a calibration strip reading where motion disturbance has occurred, such as is caused by jitter cause by the transition of the unevenly arranged continuous velocity transport ramp over a button.
Figure 3:
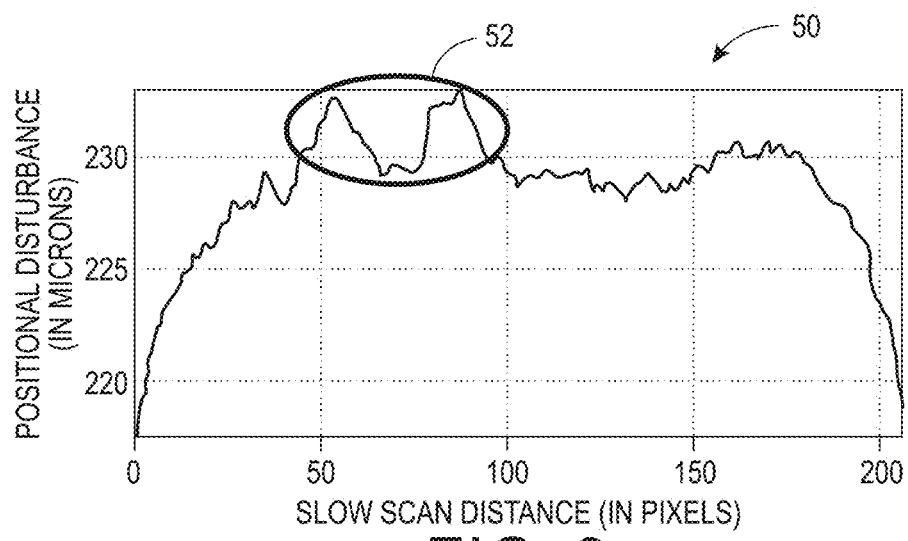
FIG. 3 illustrates a graph plotting gray value (on the y-axis) against distance in pixels (on the x-axis).
Figure 4:
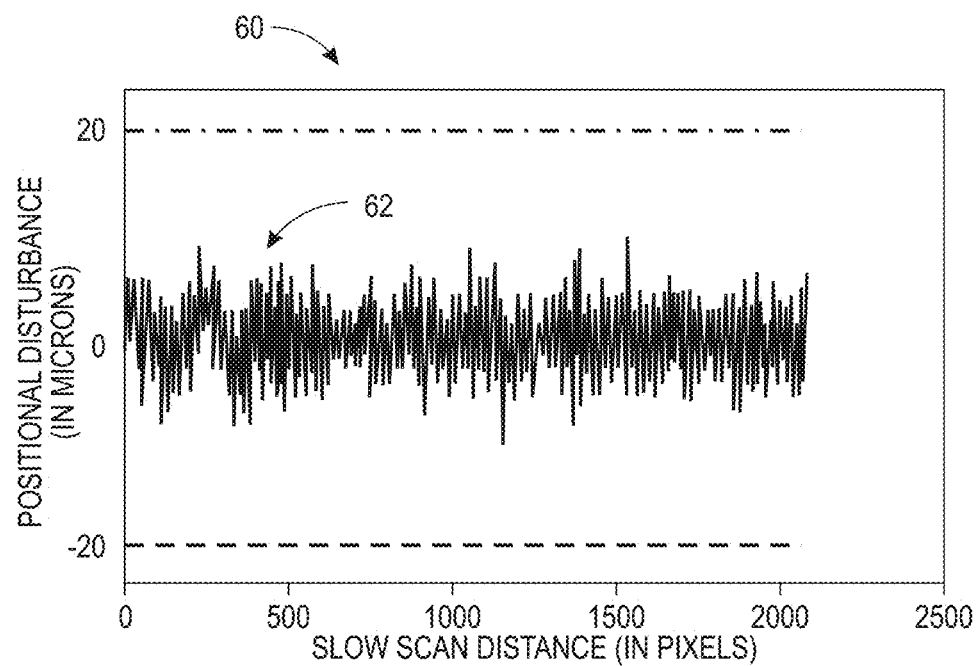
FIG. 4 shows a graph of a motion quality effect that occurs at the beginning of the platen scan when the image module is still vibrating from the ramp disturbance.
Figure 5:
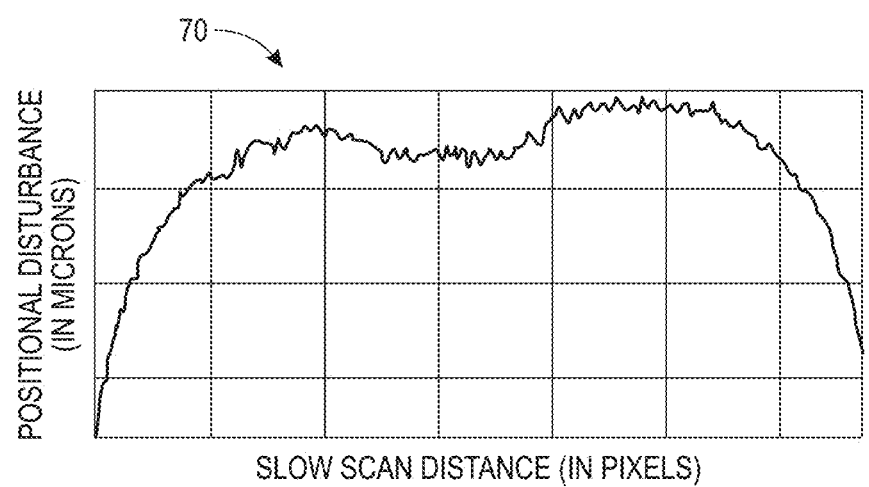
FIG. 5 illustrates a graph plotting micron positional disturbance (on the y-axis) against slow scan distance in pixels (on the x-axis) having improved uniformity due to the herein-described innovation.

FIG. 5 illustrates a graph 70 plotting micron positional disturbance (on the y-axis) against slow scan distance in pixels (on the x-axis) having improved uniformity due to the herein-described innovation. That is, by recessing the bottom of the continuous velocity transport ramp relative to the continuous velocity transport and platen glass, and by adding at least a third button to the carriage module, the transition of the carriage module past the continuous velocity transport ramp is smoothed.

FIGS. 6-10 illustrate a scanner system 100 that facilitates maintaining a constant distance between a scanned page and a calibration strip in a continuous velocity transport ramp component of a scanner during transition of a carriage module across the continuous velocity transport glass and platen glass, in accordance with one or more aspects described herein.

Figure 6:
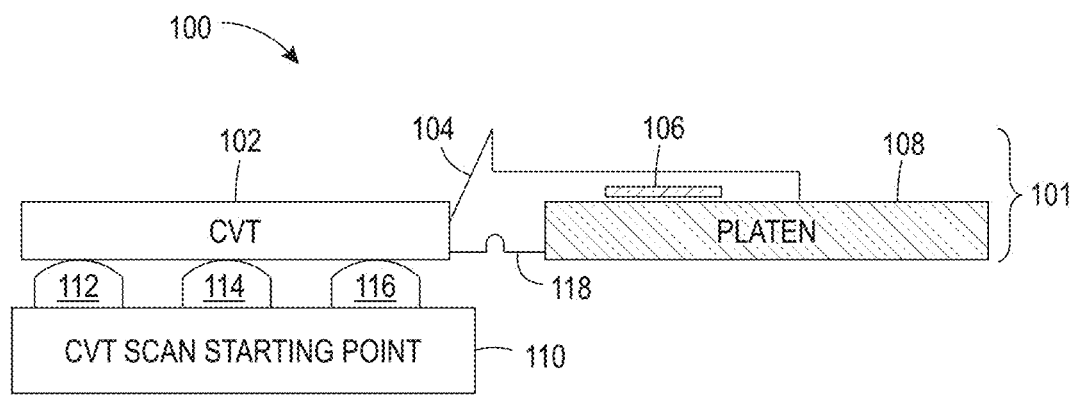
FIG. 6 illustrates a scanner system comprising a CVT-platen assembly including a continuous velocity transport ramp with a recessed bottom surface, and a contact image sensor (CIS) carriage that includes at least three buttons.
Figure 7:
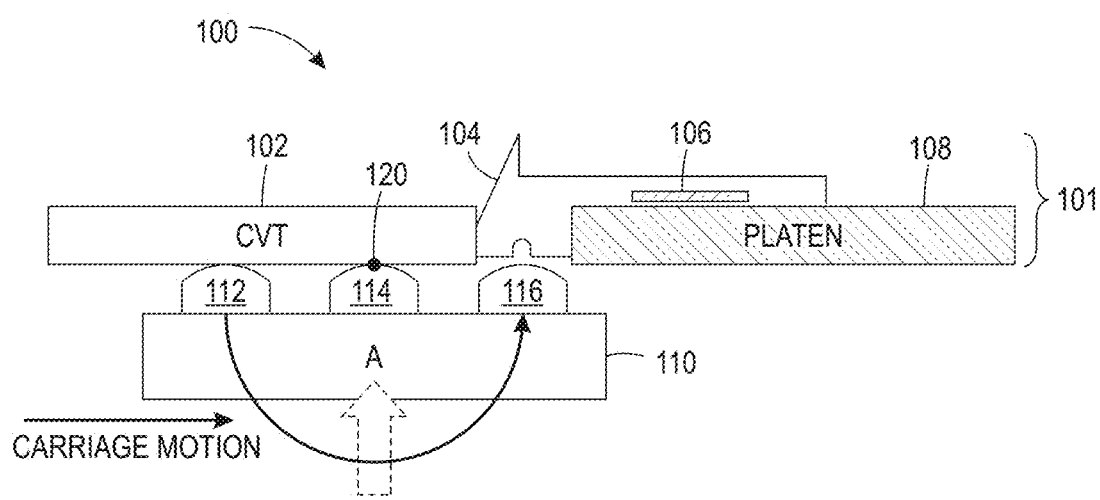
FIG. 7 illustrates the scanner system in a first stage of motion, in accordance with various features described herein.

According to FIG. 6, the scanner system 100 comprises a CVT-platen assembly including 101 a continuous velocity transport (CVT) glass portion 102, a continuous velocity transport ramp 104 comprising a calibration strip 106, and a platen glass portion 108. The scanner system further comprises a contact image sensor (CIS) (or FWA, or folded optics CCD) carriage 110 that includes at least three carriage buttons, 112, 114, and 116, which support the CIS module against the continuous velocity transport glass, continuous velocity transport ramp, and platen glass as the scanner device moves during scanning. Although various embodiments and examples described herein relate to a CIS carriage, it will be understood by those of skill in the art that the described systems may alternatively employ a Full Width Array (FWA) carriage module, a folded Charged Coupled Device (CCD) carriage module, etc., and that the herein-described features are applicable to scanners employing these optical components.

A bottom surface 118 of the continuous velocity transport ramp is recessed relative to the continuous velocity transport glass and the platen glass, to further mitigate vibration and distortion during movement of the scanning system. That is, the recessed bottom surface of the CVT ramp portion facilitates providing a smooth transition during motion of a contact image sensor (CIS) carriage module 110 past the CVT-platen assembly. The CIS carriage module comprises a plurality of carriage buttons that bias the CVT-platen assembly upward.

It is desirable that the imaging distance is accurately maintained when imaging the calibration strip, continuous velocity transport and/or platen. By recessing the continuous velocity transport ramp area (bottom surface 118) and adding at least a middle button 114 at the same or a slightly lower height than buttons 112 and 116, it is ensured that there are always at least two buttons on the glass surfaces such that there is a smoother transition than can be achieved using conventional systems.

In one embodiment, the carriage module 110 comprises at least three carriage buttons 112, 114, 116. However, it will be understood that more carriage buttons may be employed in accordance with various features described herein, and that the examples and embodiments set forth herein are not limited to a three-button arrangement. The carriage buttons may be equally spaced from each other. In a related embodiment, a middle carriage button is centered between the two end carriage buttons. Alternatively, the middle carriage button 114 may be offset from center between the two end buttons 112, 116.

In another embodiment, the middle carriage button 114 is shorter than the end carriage buttons 112, 116. For instance the middle carriage button may have a height that is in the range of 0-50 microns shorter than the end carriage buttons. In a more specific example, the middle carriage button has a height that is approximately 20 microns shorter than the end buttons. Alternatively, the plurality of carriage buttons 112, 114, 116 are of the same height relative to each other.

In yet another embodiment, the plurality of carriage buttons 112, 114, 116 are spaced such that the distance between any two carriage buttons is no greater than the distance between the CVT glass portion and the platen glass portion of the CVT-platen assembly 101.

Figure 10:
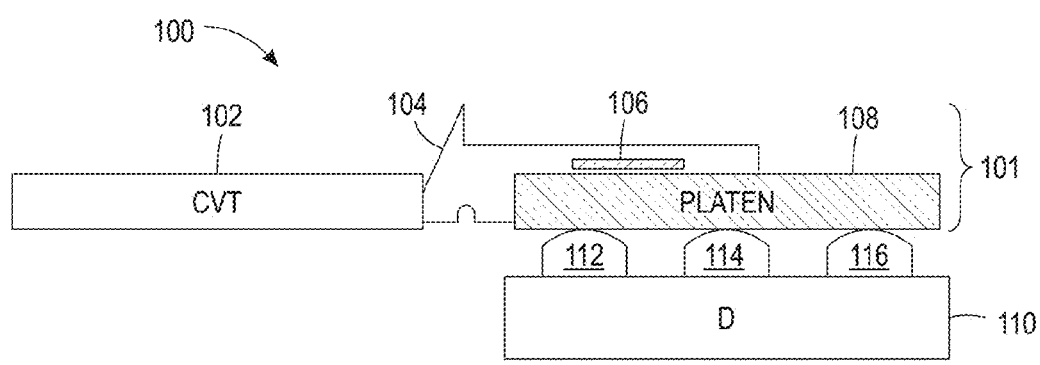
FIG. 10 illustrates the scanner system in a fourth stage of motion, in accordance with various features described herein.

With continued reference to FIGS. 6-10, the transition of the carriage module 110 is shown from a starting point (FIG. 6) through positions A-D (FIG. 7-10). Starting at the continuous velocity transport scanning point in FIG. 6, and moving through A to D in FIGS. 7-10, the middle button 114 restricts the amount of movement of the CVT-platen assembly 101 relative to the CIS carriage module 110 in positions A and C and allows the carriage 110 to become stable at position C (FIG. 9), which is before the conventional stable position D (FIG. 10). By restricting CVT-platen assembly movement during carriage motion, a distance between the CIS carriage module and the calibration strip 106 is maintained relatively constant, which mitigates or eliminates motion defects in a scanned image. Additionally, this arrangement provides added settling time for any disturbance.

The carriage 110 is biased against the glass at a midpoint as shown by the dashed arrow in A, and at the same time, it is pulled towards the platen glass, as shown by the curved solid arrow. This causes the middle button 114 to act as pivot point 120, and the carriage 110 may rotate counter-clockwise and fall in the recessed ramp area. This rotation depends on the balance of forces and torques. However, at point A (in the position shown in FIG. 7), the carriage is not yet scanning.

Figure 8:
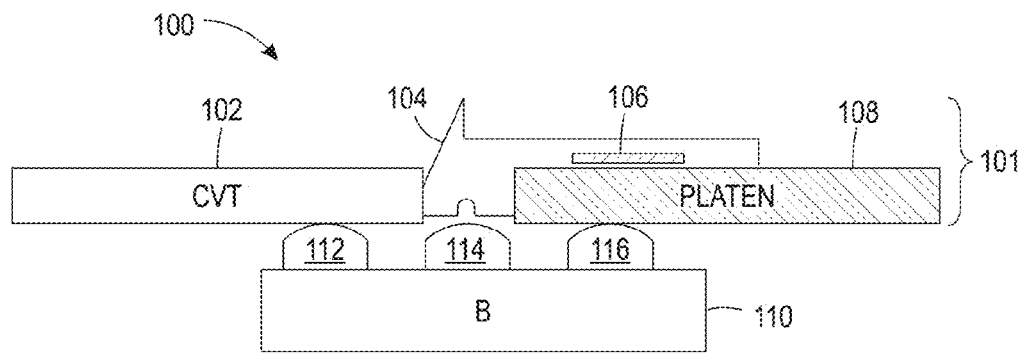
FIG. 8 illustrates the scanner system in a second stage of motion, in accordance with various features described herein.
Figure 9:
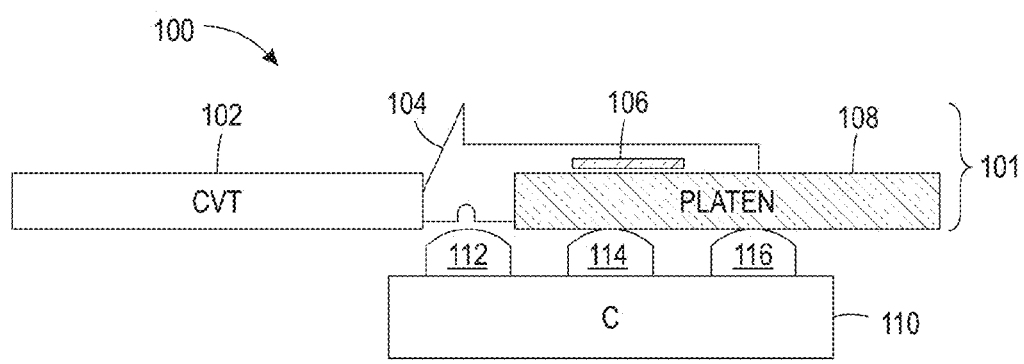
FIG. 9 illustrates the scanner system in a third stage of motion, in accordance with various features described herein.

As the carriage 110 progresses towards the platen glass, in position B of FIG. 8, it will be supported by the two outer buttons 112, 116 and become stable again. In position C of FIG. 9, the counter-clockwise torque ensures that both buttons 114, 116 remain in contact with the platen glass to facilitate providing a smooth scanned image.

When the carriage 110 is moving in the opposite direction (toward the continuous velocity transport glass), it is position C that may be unstable and position A stable again, as the torque in this direction is clockwise. However, the carriage is not scanning in this case as it is just returning to its home position.

Figure 11:
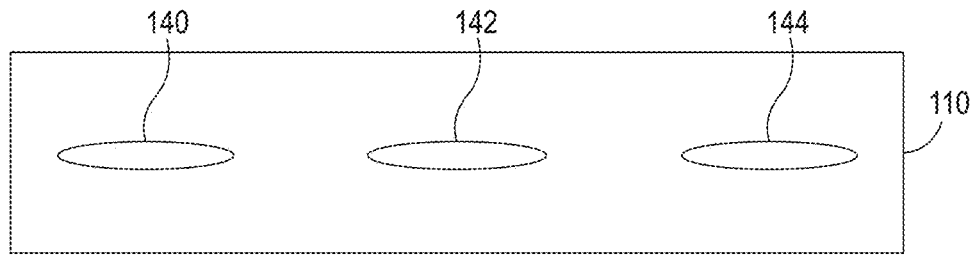
FIG. 11 shows a top view of a CIS (or FWA, or folded optics CCD) carriage module comprising a plurality of carriage skids rather than buttons, in accordance with another aspect described herein.

FIG. 11 shows a CIS (or FWA, or folded optics CCD) carriage module 110 comprising a plurality of carriage skids rather than buttons, in accordance with another aspect described herein. The carriage module with skids 140, 142, 144 may be used in conjunction with various embodiments described herein in place of the plurality of buttons described with regard to FIGS. 6-10, for instance.

In one embodiment, the carriage module 110 comprises at least three carriage skids 140, 142, 144. However, it will be understood that more carriage skids may be employed in accordance with various features described herein, and that the examples and embodiments set forth herein are not limited to a three-skid arrangement. The carriage skids 140, 142, 144 may be arranged on the carriage 110 such that the skids are parallel to a direction of travel of the carriage module during scanning. The carriage skids may be equally spaced from each other. In a related embodiment, a middle carriage skid is centered between the two end carriage skids. Alternatively, the middle carriage skid 142 may be offset from center between the two end skids 140, 144.

In another embodiment, the middle carriage skid 142 is shorter in height than the end carriage skids 140, 144. For instance the middle carriage skid may have a height that is in the range of 0-50 microns shorter than the end carriage skids. In a more specific example, the middle carriage skid has a height that is approximately 20 microns shorter than the end skids. Alternatively, the plurality of carriage skids 140, 144 are of the same height relative to each other.

In yet another embodiment, the plurality of carriage skids 140, 142, 144 are spaced such that the distance between any two carriage skids is no greater than the distance between the CVT glass portion and the platen glass portion of the CVT-platen assembly 101.

Figure 12:
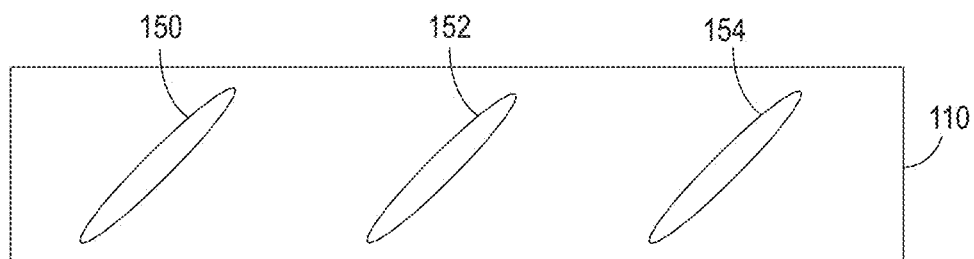
FIG. 12 shows a top view of a CIS (or FWA, or folded optics CCD) carriage module comprising a plurality of carriage skids arranged on the carriage such that the skids are diagonal or otherwise not orthogonal to a direction of travel of the CIS carriage module during scanning, in accordance with another aspect described herein.

FIG. 12 shows a CIS (or FWA, or folded optics CCD) carriage module 110 comprising a plurality of carriage skids arranged on the carriage 110 such that the skids are diagonal or otherwise not orthogonal to a direction of travel of the carriage module during scanning, in accordance with another aspect described herein. The carriage module with diagonal skids 150, 152, 154 may be used in conjunction with various embodiments described herein in place of the plurality of buttons described with regard to FIGS. 6-10, for instance.

In one embodiment, the carriage module 110 comprises at least three carriage skids 150, 152, 154. However, it will be understood that more carriage skids may be employed in accordance with various features described herein, and that the examples and embodiments set forth herein are not limited to a three-skid arrangement. The carriage skids may be equally spaced from each other. In a related embodiment, a middle carriage skid is centered between the two end carriage skids. Alternatively, the middle carriage skid 152 may be offset from center between the two end skids 150, 154.

In another embodiment, the middle carriage skid 152 is shorter in height than the end carriage skids 150, 154. For instance the middle carriage skid may have a height that is in the range of 0-50 microns shorter than the end carriage skids. In a more specific example, the middle carriage skid has a height that is approximately 20 microns shorter than the end skids. Alternatively, the plurality of carriage skids 150, 152, 154 are of the same height relative to each other.

In yet another embodiment, the plurality of carriage skids 150, 152, 154 are spaced such that the distance between any two carriage skids is no greater than the distance between the CVT glass portion and the platen glass portion of the CVT-platen assembly 101.

Figure 13:
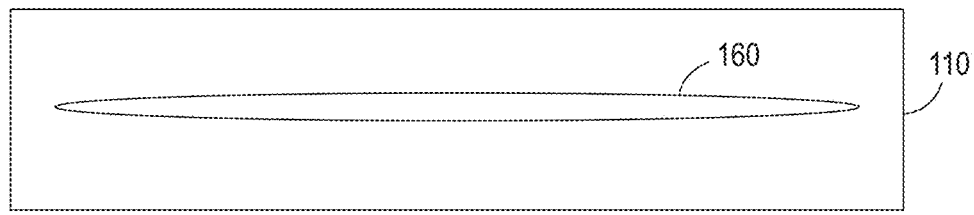
FIG. 13 shows a top view of a CIS (or FWA, or folded optics CCD) carriage module comprising a single carriage skid arranged on the carriage parallel to a direction of travel of the CIS carriage module during scanning, in accordance with another aspect described herein.

FIG. 13 shows a CIS (or FWA, or folded optics CCD) carriage module 110 comprising a single carriage skid 160 arranged on the carriage 110 parallel to a direction of travel of the carriage module during scanning, in accordance with another aspect described herein. The carriage module with the parallel skid 160 may be used in conjunction with various embodiments described herein in place of the plurality of buttons described with regard to FIGS. 6-10, for instance.

The exemplary embodiments have been described. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A scanner system that facilitates mitigating motion disturbances during scanning to improve image quality, comprising:
   a continuous velocity transport (CVT)-platen assembly comprising:
      a CVT glass portion;
      a platen glass portion; and a CVT ramp portion positioned between the CVT glass portion and the platen glass portion, wherein a bottom surface of the CVT ramp portion is recessed relative to a bottom surface of the CVT glass portion and a bottom surface of the platen glass portion; and a carriage module comprising a plurality of carriage buttons that bias the CVT-platen assembly upward.

2. The scanner system according to claim 1, wherein the plurality of carriage buttons comprises at least first, second, and third carriage buttons, wherein the second carriage button is positioned between the first and third carriage buttons.

3. The scanner system according to claim 2, wherein the second carriage button is shorter than the first and third carriage buttons.

4. The scanner system according to claim 2, wherein the second carriage button is up to 50 microns shorter than the first and third carriage buttons.

5. The scanner system according to claim 2, therein the second carriage button is centered between the first and third carriage buttons.

6. The CVT-platen assembly according to claim 1, wherein the plurality of carriage buttons is spaced such that the distance between two carriage buttons is no greater than the distance between the CVT glass portion and the platen glass portion.

7. The scanner system according to claim 1, wherein the plurality of carriage buttons is of the same height relative to each other.

8. The scanner system according to claim 1, wherein the carriage module is a contact image sensor (CIS) carriage module.

9. The scanner system according to claim 1, wherein the carriage module is on of a Full Width Array (FWA) carriage module and a folded optics Charged Coupled Device (CCD) carriage module.

10. A scanner system that facilitates mitigating vibration during scanning to improve image quality, comprising:
    a continuous velocity transport (CVT)-platen assembly comprising:
        a CVT glass portion;
        a platen glass portion; and
        a CVT ramp portion positioned between the CVT glass portion and the platen glass portion, wherein a bottom surface of the CVT ramp portion is recessed relative to a bottom surface of the CVT glass portion and a bottom surface of the platen glass portion; and
    a carriage module comprising a plurality of carriage skids that bias the CVT-platen assembly upward.

11. The scanner system according to claim 10, wherein the plurality of carriage skids comprises at least first, second, and third carriage skids.

12. The scanner system according to claim 11, wherein the second carriage skid is positioned between the first and third carriage skids.

13. The scanner system according to claim 12, wherein the second carriage skid is shorter in height than the first and third carriage skids.

14. The scanner system according to claim 11, wherein the second carriage skid is up to 50 microns shorter in height than the first and third carriage skids.

15. The scanner system according to claim 11, therein the second carriage skid is centered between the first and third carriage skids.

16. The scanner system according to claim 10, wherein the plurality of carriage skids is spaced such that the distance between two carriage skids is no greater than the distance between the CVT glass portion and the platen glass portion.

17. The scanner system according to claim 10, wherein the plurality of carriage skids is of the same height relative to each other.

18. The scanner system according to claim 10, wherein the plurality of carriage skids is arranged parallel to a direction of travel of the CIS carriage module.

19. The scanner system according to claim 10, wherein the plurality of carriage skids is arranged in a non-orthogonal orientation relative to a direction of travel of the CIS carriage module.

20. The scanner system according to claim 10, wherein the plurality of carriage skids is arranged in a diagonal orientation relative to a direction of travel of the CIS carriage module.

21. The scanner system according to claim 10, wherein the carriage module is a contact image sensor (CIS) carriage module.

22. The scanner system according to claim 10, wherein the carriage module is on of a Full Width Array (FWA) carriage module and a folded optics Charged Coupled Device (CCD) carriage module.

23. A scanner system that facilitates mitigating vibration during scanning to improve image quality, comprising:
    a continuous velocity transport (CVT)-platen assembly comprising:
        a CVT glass portion;
        a platen glass portion; and
        a CVT ramp portion positioned between the CVT glass portion and the platen glass portion, wherein a bottom surface of the CVT ramp portion is recessed relative to a bottom surface of the CVT glass portion and a bottom surface of the platen glass portion; and
    a carriage module comprising single skid that biases the CVT-platen assembly upward during scanning, wherein the skid is positioned such that it runs parallel to a direction of travel of the CIS carriage module.

24. The scanner system according to claim 23, wherein the carriage module is one of a contact image sensor (CIS) carriage module, a Full Width Array (FWA) carriage module, and a folded optics Charged Coupled Device (CCD) carriage module.

* * * * *